March 10, 1970

T. F. SARAH 3,499,613

FISHING REEL SELECTIVELY CONVERTIBLE TO
RIGHT- OR LEFT-HANDED OPERATION

Filed April 18, 1968

INVENTOR.
THOMAS F. SARAH
BY Hamilton, Cook,
Renner & Kenner
ATTORNEYS

INVENTOR.
THOMAS F. SARAH
BY Hamilton, Cook,
Renner & Kenner
ATTORNEYS

United States Patent Office 3,499,613
Patented Mar. 10, 1970

3,499,613
FISHING REEL SELECTIVELY CONVERTIBLE TO RIGHT- OR LEFT-HANDED OPERATION
Thomas F. Sarah, Akron, Ohio, assignor, by mesne assignments, to Shakespeare Company, Kalamazoo, Mich., a corporation of Delaware
Filed Apr. 18, 1968, Ser. No. 722,476
Int. Cl. A01k 89/00
U.S. Cl. 242—84.21                10 Claims

ABSTRACT OF THE DISCLOSURE

A fishing reel having a crank assembly adapted to convert the reel for use by either a right-handed or left-handed fisherman. The crank assembly has a first and second connector portion. The drive gear by which the line pickup mechanism can be selectively actuated is supported on an arbor that extends transversely across, and is accessible from, exteriorly of the housing. One end of the arbor is adapted to be fastened only to the first connector portion of the crank assembly (for use by an angler of one hand) and the opposite end of the arbor is adapted to be fastened only to the second connector portion (for use by an angler of opposite hand). The connector portions are detachably secured to the respective ends of the arbor by thread means of opposite hand so that the rotational direction of the crank preferred by either the right- or left-handed angler may be utilized without tending to loosen the connection between the arbor and crank assembly and without requiring any other changes to the reel. The reel is also provided with level wind and anti-reverse mechanisms operative irrespective of whether the reel is rigged for use by a right- or left-handed fisherman.

BACKGROUND OF THE INVENTION

In spinning and spin casting reels the spool remains stationary when casting and, generally also, when retrieving the fishing line. Unlike the bait casting reel in which the spool revolves both during the cast and the retrieve, there is no spool inertia—either static, which must be overcome at the beginning of the cast, or dynamic, for which a thumbing, or braking, action must be applied to prevent backlash.

To the beginning angler the spinning and spin casting reel thus offers an advantageous ease in learning that does not exist with conventional bait casting reels. And, once the fisherman learns to use a spinning or spin casting type of reel he finds that they are ideally suited both for casting lures that are too light for bait casting equipment and for casting into head winds. Moreover, spinning and spin casting reels can be manufactured at a lower cost than comparable bait casting reels in which parts and tolerances are far more critical.

A further advantage incident to spinning and spin casting is that the rod need not be shifted from one hand to another as is conventional when bait casting. Thus, after the cast the fisherman need only move his free hand to the reel crank and begin the retrieve.

Spinning and spin casting reels are normally made for the right-handed man. Accordingly, spinning reels (which are generally mounted beneath the rod) and spin casting reels (which are generally mounted on top of the rod) both have the reel crank positioned on the left side, as seen by the fisherman when holding the rod on which the reel is mounted in a position preparatory to casting. With this orientation the rod may be constantly held in the right hand, and the left hand need only be used to turn the reel crank.

A left-handed fisherman is thus put to a disadvantage with conventional spinning and spin-casting reels since it would be more convenient for him to hold the rod in his left hand and operate the reel with his right hand. Some reel manufacturers have attempted to accommodate the left-handed fisherman by providing convertible reels, but none of the prior known concepts have been wholly successful. One prior known concept required that the reel housing be constructed in such a way that the drive gear and crank could be transplanted from one side of the reel to the other. The primary drawback of reels embodying this concept is that rotation of the crank normal to the left-handed fisherman will reverse the rotational direction of the line pickup. In a spin casting reel utilizing a radially oriented pickup pin reverse rotation will retrieve the line if the line has been wound on the spool for retrieval by rotation in that direction. However, with a spinning reel not only must the line be properly wound on the spool but a special bail must also be employed when the reel is converted.

Another approach to the provision of convertible reels has been to extend the shaft on the drive gear such that it is available from either side of the reel. The crank is then selectively fastened to either end of the drive gear by a fastening means—normally either a nut or cap screw. In either event, this third, independent part—the fastening means—is threaded onto the gear shaft to secure the crank thereto. Being independent it can easily loosen and be lost unless the angler exercises constant vigil. Furthermore, by the very nature of a threaded connection the fastening means will tend to loosen by rotation of the crank in one direction. Hence, the manufacturer may elect whether the direction the crank is rotated during the retrieve for a right- or left-handed fisherman will tend to loosen the fastening means

SUMMARY OF THE INVENTION

It is therefore the primary object of the present invention to provide a convertible crank assembly for a fishing reel that will not tend to loosen irrespective of whether it is mounted for use by a right- or left-handed fisherman.

It is another object of the present invention to provide a crank assembly, as above, that does not require independent, or separable, fastening means.

It is a further object of the present invention to provide a crank assembly, as above, which will permit conversion between right- and left-hand operation of a fishing reel without requiring replacement of the line pickup mechanism and without requiring a reversal from the desired direction in which the crank must be rotated to retrieve the line so that the line may be retrieved onto the spool without a reversal in direction irrespective of whether the reel is rigged for right- or left-hand operation.

It is a still further object of the present invention to provide a crank assembly, as above, that is economical to manufacture and durable in use.

These and other objects, as well as the advantages thereof over existing and prior art forms, will be apparent in view of the following detailed description of the attached drawings and are accomplished by means hereinafter described and claimed.

In general, a fishing reel embodying the concept of the present invention employs a crank assembly selectively adapted for use by either a right-handed or left-handed fisherman. The drive gear by which the line pickup mechanism can be selectively actuated is supported on an arbor thtat extends transversely across, and is accessible from exteriorly of, the housing. Each end of the arbor is provided with a bore and a counterbore. The crank has a first and second connector portion the outer surfaces of which are provided with threads of opposite hands. The outer diameter of the threads on the second connector portion is less than the root diameter of the threads on the first connector portion. The threads on the first connector portion intermesh with threads on the interior of the bore in the first end of the arbor, but the diameter of the bore in the second end of the arbor is greater than the outer diameter of those threads. Similarly, the counterbore in the second end of the arbor will intermesh with threads on the second connector portion, but the diameter of the counterbore in the first end of the arbor is greater than the outer diameter of the threads in the second connector portion. The reel is also provided with level wind and anti-reverse mechanisms operative irrespective of whether the reel is rigged for use by a right- or left-handed fisherman.

A preferred embodiment of the present invention is shown by way of example in the accompanying drawings and is described in detail without attempting to show all of the various forms and modifications in which the invention might be embodied; the invention being measured by the appended claims and not by the details of the specification.

DETAILED DESCRIPTION OF A PREFERRED EMBODIMENT

Figure 1:
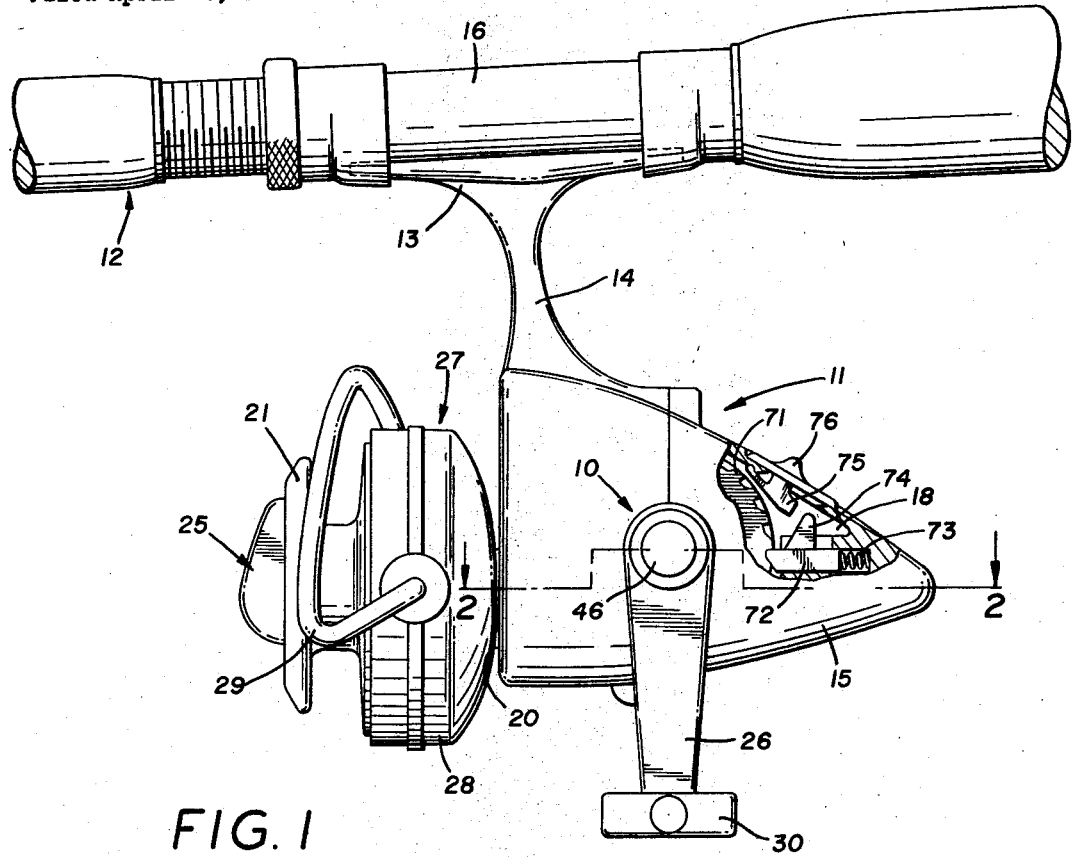
FIG. 1 is a side elevation, partly broken away, of a spinning reel embodying the concept of the present invention.

Referring more particularly to the drawings, the improved crank assembly, indicated generally by the numeral 10, is disclosed in conjunction with a spinning reel 11. It should be appreciated that the subject concept is not limited to use with a spinning reel but may be as well adapted to spin casting and other reels, as will be appreciated by those skilled in the art.

The spinning reel 11 is adapted to be detachably mounted on the under side of a rod 12, as by a mounting foot 13, in a well-known manner. A mounting leg 14 spaces the reel housing 15 sufficiently below the mounting foot 13 so that the fisherman may grasp the rod handle 16 with his fingers straddling the mounting leg 14 and positioned between the housing 15 and the mounting foot 13.

The interior of the housing 15 defines a gear chamber 18 and receives a shaft 19 which extends from front to rear—i.e., longitudinally—through the gear chamber and outwardly thereof through the forward wall 20 to support a spool 21. The shaft is fixed against rotation, as by splines 22 on the rearmost end thereof that engage corresponding grooves 23 in the blind cavity 24 formed in the housing 15 to receive the rear end of the shaft. By using a spline connection the shaft 19 may be reciprocated axially, as will be more fully hereinafter described.

The spool 21, though normally nonrotatable with respect to the shaft 19, is connected thereto by an adjustable brake, or drag, mechanism 25 in the conventional fashion. In this way the spool 21 may be selectively permitted to rotate with respect to the shaft 19 so that a fish may run with the line without breaking it while the crank arm 26 is maintained in a stationary position either by the angler's hand or an anti-reverse mechanism.

A gear train within the chamber 18 connects the crank arm 26 to the line pickup mechanism 27—specifically, the flyer 28 on which the bail 29 is carried. The crank arm 26, on which the handle 30 is carried, is connected, by a unique arrangement more fully hereinafter described, to the support arbor 31 of the drive gear 32. The arbor 31 is journaled across the gear chamber 18 transversely of the shaft 19 and displaced therefrom, as best seen in FIG. 3.

The drive gear 32 connects to the line pickup mechanism 27 by a motion transfer means, specifically, the radial teeth 33 on drive gear 32 mesh with a pinion 34 secured to a sleeve 35 rotatably mounted on shaft 19. The sleeve 35 is journaled through the forward wall 20 of housing 15 and carries the flyer 28. Because the shaft 19 on which the pinion 34 is rotatably mounted must be offset from the rotational axis of the drive gear 32 (defined by the axis of arbor 31) the pinion 34 must have helical teeth 36 so that rotation of the drive gear 32 caused by the fisherman rotating the crank arm 26 will result in a smooth correlative rotation of the flyer 28.

In order that the line may be level wound upon the spool 21, the spool is axially reciprocated with respect to the bail 29 as the flyer 28 rotates. Because the arbor 31 is displaced from the shaft 19 and further because the arbor 31 extends completely across the gear chamber 18, conventional linkage to effect the level wind is inappropriate.

Figure 3:
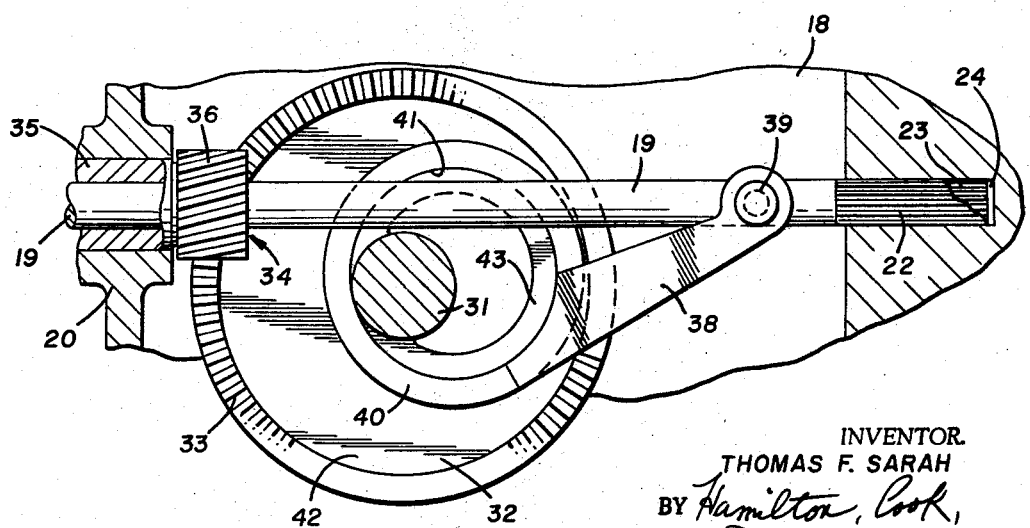
Figure 2:
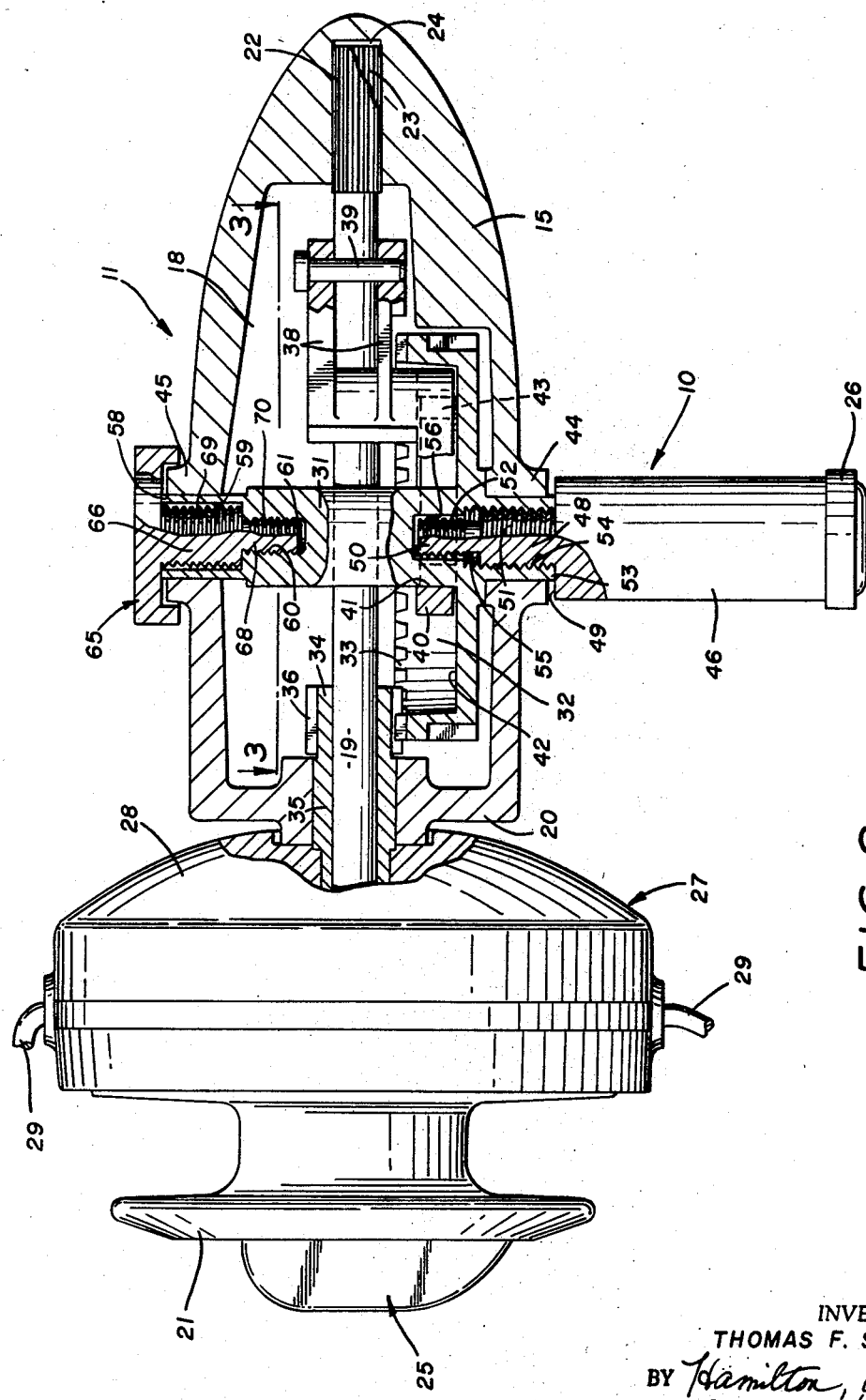
FIG. 2 is an enlarged broken section taken substantially on line 2—2 of FIG. 1; and, FIG. 3 is a partial cross section taken substantially on line 3—3 of FIG. 2.

The special linkage used to effect level wind in the subject reel is best shown in FIGS. 2 and 3. One end of a bifurcated swing arm 38 is pivotally attached to the shaft 19, as by pin 39. The other end of the swing arm 38 terminates in a hoop 40 having a radially inwardly directed annular surface 41. As best shown in FIG. 2, the swing arm extends forward from the pivot pin 39 in alignment with the shaft 19 to clear the teeth 33 on drive gear 32. Radially inwardly of the teeth 33 the hoop 40 may be displaced laterally of the swing arm 38 to lie in juxtaposition to the radially oriented spider face 42.

The hoop 40 encircles the arbor 31, and the radially inwardly directed annular surface 41 thereon slidingly engages a throw means, such as the boss 43 extending outwardly from the spider face 42 of drive gear 32 in eccentric relation with the arbor 31. Thus, as the drive gear 32 is rotated to retrieve line the interaction of the boss 43 with the inner, annular surface 41 on hoop 40 causes axial reciprocation of the shaft 19 and spool 21 so that the line will level wind onto the spool as the line is retrieved through the bail 29.

As is also best seen in FIG. 2, by having the arbor 31 extend transversely across the gear chamber 18 and by having the arbor journaled in opposed bosses 44 and 45 in housing 15, the opposite ends thereof are accessible from exteriorly of the housing. By selectively attaching the crank arm 26 to one end or the other of arbor 31 by the unique configuration disclosed herein the reel 11 may be readily converted from right-to left-hand operation or vice versa.

A crank shaft 46 is affixed to and extends from the crank arm 26. The end of the crank shaft 46 opposite the end affixed to the crank arm has a first connector portion 48 preferably of a diameted reduced from the diameter of the crank shaft 46 to form a stop shoulder 49 to engage the ends of arbor 31. Concentrically of the first connector portion 48 is a second connector portion 50. The outer surface of the first connector portion 48 is provided with threads 51. The outer surface of the second connector portion 50 is also provided with threads 52. However, the outer diameter of the threads 52 on the second connector portion 50 is less than the root diameter of the threads 51 on the first connector portion 48 and of opposite hand.

Each end of the arbor 31 is bored and counterbored to receive the first and second connector portions 48 and 50. The left end 53, as the fisherman observes the reel and as is depicted in FIG. 2, has a bore 54 provided with threads 55 adapted to intermesh with the threads 51 on the first connector portion 48. Inasmuch as the crank arm 26 is located on this side of the spinning reel when it is being used by a right-handed fisherman it is preferred that the meshing threads 51 and 55 be of left-hand so that the normal direction in which the crank arm 26 is rotated by a right-handed fisherman to retrieve the line will not tend to loosen the attachment between the crank shaft 46 and the arbor 31 but rather tighten, or secure, the attachment.

A counterbore 56 concentric with bore 54 is also provided on the left end 53 of the arbor 31. The diameter of counterbore 56 is of greater diameter than the outer diameter of the threads 52 on the second connector portion 50 so that the second connector portion 50 can be received therein without interfering with the threaded interengagement of the first connector portion 48 and bore 54.

The right end 58 of arbor 31 is also provided with a bore 59 and a counterbore 60 concentric with the bore 59. On this end of the arbor 31 the counterbore 60 is provided with threads 61 adapted to intermesh with threads 52 on the second connector portion 50, and the bore 59 has an internal diameter greater than the outer diameter of the threads 51 on the first connector portion 48. Inasmuch as the crank arm 26 is located on this side of the spinning reel 11 when it is being used by a left-handed fisherman it is preferred that the meshing threads 52 and 61 be of right hand so that the normal direction in which the crank arm 26 is rotated by a left-handed fisherman to retrieve line will similarly not loosen, but rather tighten, the attachment of the crank arm 26 to the arbor 31. The relative diameters of the threads 51 on the first connector portion 48 and the bore 59 permit the threads 61 in counterbore 60 to mesh with threads 52 on the second connector portion 50 without interference.

In order to cap that end of the arbor 31 opposite that to which the crank arm 26 is attached, a plug 65 may be provided. The plug 65 may be provided with first and second engaging portions 66 and 68, respectively. The engaging portions 66 and 68 are respectively provided with threads 69 and 70 corresponding to the threads 51 and 52 so that the plug 65 may be secured to the arbor 31 in the same fashion as crank shaft 46.

It should be noted that by using threads of opposite hand to attach the crank shaft 46 to the arbor 31 normal rotation of the crank arm 26 from either side of the reel 11 will cause the flyer 28, and bail 29, to rotate in the proper direction. Thus, a reel provided with the subject convertible crank assembly 10 may also be provided with a single, common, anti-reverse mechanism operable for either a right- or left-handed fisherman.

A preferred anti-reverse mechanism is best shown in FIG. 1. The radial outer periphery of drive gear 32 is provided with ratchet teeth 71 engageable by a plunger pawl 72 biased into engagement therewith by a spring 73. A dog 74 extending transversely from the pawl 72 is selectively engageable by a lug 75 on slide button 76 to retain the pawl 72 disengaged from the ratchet teeth 71. The slide button is preferably located on the upper, rear of the housing 15 for convenient access to either a right or left-handed angler.

A reel embodying the concept of the present invention is therefore capable of facile conversion from right- to left-handed operation and otherwise accomplishes the objects of the invention.

I claim:

1. A crank assembly for a fishing reel by which the reel is convertible between right- and left-handed operation, said reel having a housing in which a drive gear is mounted, said crank assembly comprising, an arbor on which the drive gear is fixed for rotation with said arbor, said arbor having opposed ends accessible from opposite sides of the housing, a crank having first and second connector portions, one end of said arbor defining first means adapted to engage only said first connector portion, the opposed end of said arbor defining second means adapted to engage only the second connector portion.

2. A crank assembly, as set forth in claim 1, in which the first and second connector portions are axially aligned and in which the first and second means at the opposed ends of the arbor are each in the form of a bore and a counterbore to receive said first and second connecting portions, respectivey.

3. A crank assembly, as set forth in claim 2, in which the outer surfaces of said first and second connector portions are each provided with thread means, the hand of the thread means on said first connector portion being opposite the hand of the thread means on said second connector portion.

4. A crank assembly, as set forth in claim 3, in which the outer diameter of the thread means on said second connector portion is less than the root diameter of the thread means on said first connector portion.

5. A crank assembly, as set forth in claim 4, in which said first means is formed as thread means provided on the interior of the bore in the first end of said arbor to intermesh with threads on said first connector portion, the internal diameter of the bore in the second end of said arbor being greater than the outer diameter of the thread means on said first connector portion, and in which said second means is formed as thread means provided on the interior of the counterbore in the second end of said arbor to intermesh with thread means on said second connector portion, the internal diameter of the counterbore in the first end of said arbor being greater than the outer diameter of the thread means on said second connector portion.

6. A fishing reel comprising, a housing, a gear chamber within said housing, a shaft reciprocatingly mounted in said housing to extend through said gear chamber and outwardly of said housing, a line spool, said line spool mounted on said shaft, a line pickup mechanism carried on said housing in proximity to said line spool, an arbor journaled in said housing transversely of said shaft and within said gear chamber, a drive gear fixed to said arbor, said arbor having opposed ends exteriorly accessible from opposite sides of said housing, a motion transfer means between said drive gear and said pickup mechanism so that said pickup device will retrieve line onto said spool upon rotation of said drive gear, a crank for rotating said drive gear, said crank having first and second connector portions, one end of said arbor defining first means adapted to engage only said first connector portion, the opposed end of said arbor defining second means adapted to engage only said second connector portion to permit the reel to be convertible between right- and left-hand operation.

7. A reel, as set forth in claim 6, in which link means join said shaft to said drive gear so that said spool is reciprocated as said drive gear is rotated by said crank arm to effect a level wind of the line on said spool during retrieve.

8. A reel, as set forth in claim 7, in which the link means comprises, a swing arm, one end of said swing arm pivotally attached to said shaft, a hoop means on the opposite end of said swing arm, said hoop means encircling said arbor, a throw means on said drive gear located eccentrically of said arbor and engaging said hoop to reciprocate said shaft in response to rotation of said drive gear.

9. A reel, as set forth in claim 8, in which the first and second connector portions are each provided with thread means, the hand of the thread means on said first connector portion being opposite the hand of the thread means on said second connector portion, and an anti-reverse lock common to the connection of said first and second connector means to said arbor.

10. A reel, as set forth in claim 6, in which the motion transfer means connecting said line pickup mechanism to said drive gear comprises a sleeve rotatably mounted on said shaft, said sleeve extending from said gear chamber through said housing to mount the line pickup mechanism exteriorly thereof, a pinion connected to said sleeve within said gear chamber, said pinion having helical teeth to engage said drive gear.

References Cited

UNITED STATES PATENTS

| | | | |
|---|---|---|---|
| 1,306,603 | 6/1919 | Mangels | 74—548 |
| 2,745,607 | 5/1956 | Taggart et al. | 242—84.21 |
| 2,879,954 | 3/1959 | Small | 242—84.21 |
| 3,061,232 | 10/1962 | Clark | 242—84.1 XR |

FOREIGN PATENTS

| | | |
|---|---|---|
| 1,374,520 | 8/1964 | France. |
| 798,024 | 7/1958 | Great Britain. |
| 922,739 | 4/1963 | Great Britain. |

BILLY J. TAYLOR, Primary Examiner

U.S. Cl. X.R.

74—548